(12) United States Patent
Tsui et al.

(10) Patent No.: US 12,348,261 B2
(45) Date of Patent: Jul. 1, 2025

(54) PORT RECONFIGURATION FOR PASSIVE INTERMODULATION INTERFERENCE MITIGATION

(71) Applicants: AT&T Intellectual Property I, L.P., Atlanta, GA (US); AT&T Mobility II LLC, Atlanta, GA (US)

(72) Inventors: Ernest Tsui, Pleasanton, CA (US); Michael Taylor, Cumming, GA (US); Weihua Ye, Chicago, IL (US); Young Suh, Danville, CA (US); Paul Maxwell, Alamo, CA (US); Guanying Ru, San Ramon, CA (US); James Hollister, Carnation, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 70 days.

(21) Appl. No.: 18/299,652

(22) Filed: Apr. 12, 2023

(65) Prior Publication Data
US 2023/0254004 A1 Aug. 10, 2023

Related U.S. Application Data

(63) Continuation of application No. 17/092,032, filed on Nov. 6, 2020, now Pat. No. 11,658,697.

(51) Int. Cl.
*H04B 1/525* (2015.01)
*H04B 1/10* (2006.01)
(Continued)

(52) U.S. Cl.
CPC ........... *H04B 1/525* (2013.01); *H04B 1/1027* (2013.01); *H04W 72/046* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 5,960,350 A * | 9/1999 | Schorman | H04W 16/28 455/450 |
| 6,034,638 A * | 3/2000 | Thiel | H01Q 1/245 343/702 |

(Continued)

FOREIGN PATENT DOCUMENTS

| | | | |
|---|---|---|---|
| JP | 2002305477 A | * | 10/2002 |
| KR | 20160137242 A | * | 11/2016 |

(Continued)

*Primary Examiner* — Andrew C Oh

(57) ABSTRACT

Embodiments for port reconfiguration for passive intermodulation interference mitigation are presented herein. A base station device comprises a signal processing component comprising a passive intermodulation interference component and an antenna configuration component. The passive intermodulation interference component determines passive intermodulation interference corresponding to uplink signals that have been received, via a configurable cellular antenna array of the base station device, from respective wireless devices of a group of wireless devices that have been communicatively coupled to the base station device. The antenna configuration component selects a defined configuration of a group of cellular antenna ports of the configurable cellular antenna array to facilitate a reduction of the passive intermodulation interference corresponding to the uplink signals.

20 Claims, 11 Drawing Sheets

(51) Int. Cl.
*H04W 72/044* (2023.01)
*H04W 72/21* (2023.01)
*H04W 72/23* (2023.01)

(56) References Cited

U.S. PATENT DOCUMENTS

| | | | | |
|---|---|---|---|---|
| 2004/0224637 | A1* | 11/2004 | Silva | H04W 72/046 |
| | | | | 455/562.1 |
| 2008/0259826 | A1* | 10/2008 | Struhsaker | H04W 84/14 |
| | | | | 370/280 |
| 2009/0061939 | A1* | 3/2009 | Andersson | H04B 7/082 |
| | | | | 455/562.1 |
| 2011/0111749 | A1* | 5/2011 | Kim | H04W 24/10 |
| | | | | 455/423 |
| 2012/0225625 | A1* | 9/2012 | Asplund | H04B 7/0632 |
| | | | | 455/77 |
| 2013/0273934 | A1* | 10/2013 | Meredith | H04W 16/04 |
| | | | | 455/456.1 |
| 2015/0365180 | A1* | 12/2015 | Björkén | H04W 24/02 |
| | | | | 455/296 |
| 2019/0052294 | A1* | 2/2019 | Abdelmonem | H04W 52/223 |
| 2020/0154442 | A1* | 5/2020 | Zhou | H04B 1/525 |
| 2021/0318692 | A1* | 10/2021 | Lloyd | G06Q 10/08 |

FOREIGN PATENT DOCUMENTS

| | | | | |
|---|---|---|---|---|
| WO | WO-2017188733 A1 * | 11/2017 | | H04L 5/14 |
| WO | WO-2018127001 A1 * | 7/2018 | | H04W 72/04 |

* cited by examiner

PORT RECONFIGURATION FOR PASSIVE INTERMODULATION INTERFERENCE MITIGATION

RELATED APPLICATION

The subject patent application is a continuation of, and claims priority to, U.S. patent application Ser. No. 17/092,032, filed Nov. 6, 2020, and entitled "PORT RECONFIGURATION FOR PASSIVE INTERMODULATION INTERFERENCE MITIGATION," the entirety of which priority application is hereby incorporated by reference herein.

TECHNICAL FIELD

The subject disclosure generally relates to embodiments for port reconfiguration for passive intermodulation interference mitigation.

BACKGROUND

Passive intermodulation (PIM) creates interference in cellular transmission technologies, e.g., multiple-input multiple-output (MIMO), massive MIMO (mMIMO), full dimension MIMO (FD-MIMO), etc. Conventional cellular technologies utilize common public radio interface (CPRI) based tools to measure PIM interference, and use manual means to physically remove, clean, replace, etc. estimated PIM sources, e.g., objects; rusty, loose, etc. metallic connection(s), bracket(s), etc. of antennas; etc. However, such manual PIM interference reduction measures are tedious, labor intensive, and costly.

Consequently, conventional cellular technologies have had some drawbacks with respect to reducing the effects of PIM interference in a cellular system, some of which are noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
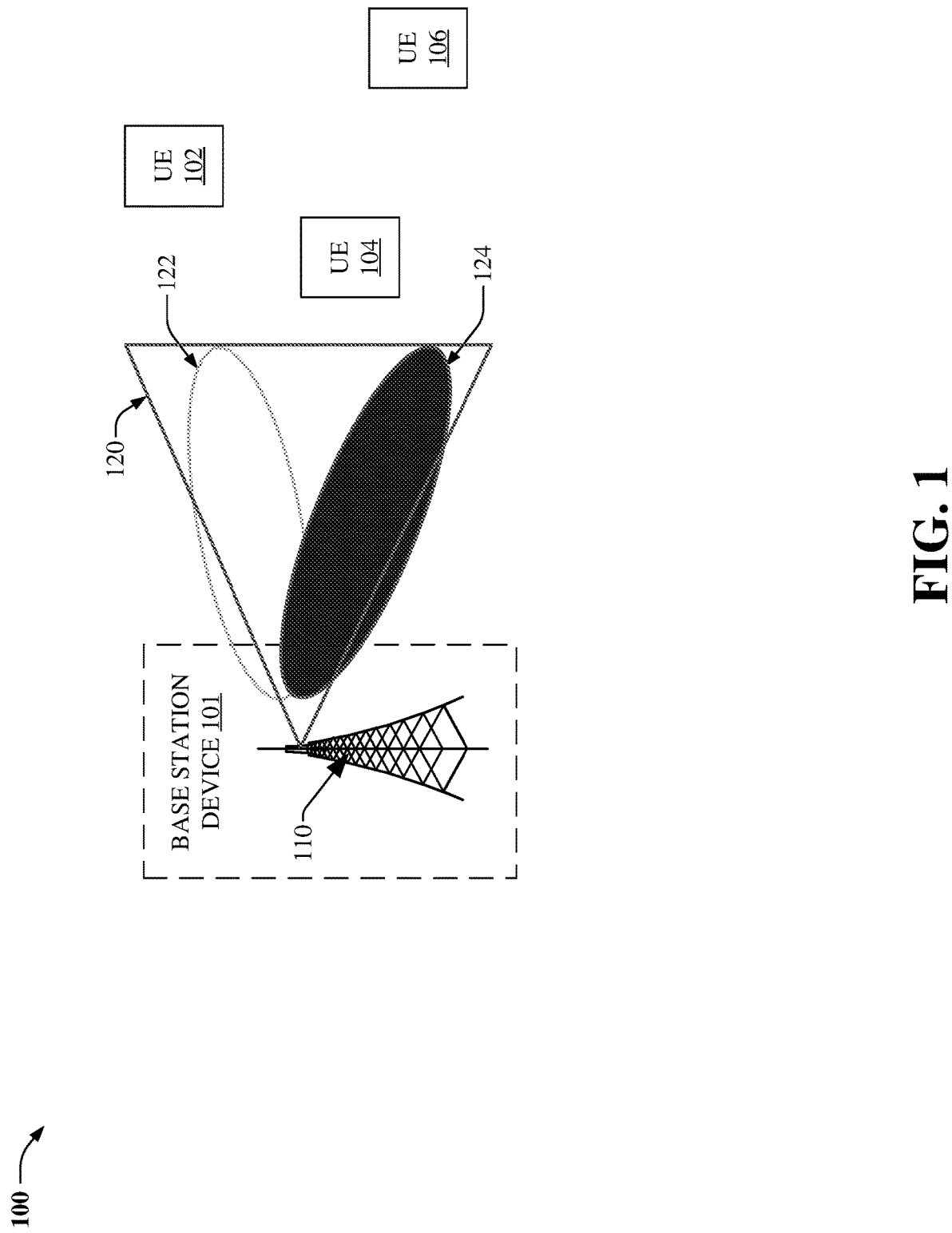
FIG. 1 illustrates a block diagram of a cellular system comprising a base station device that performs port reconfiguration of a configurable cellular antenna array of the base station device for PIM interference mitigation, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional cellular technologies have had some drawbacks with respect to reducing PIM interference, e.g., utilizing manual means to remove estimated PIM sources identified by CPRI based tools. Various embodiments disclosed herein can reduce PIM interference by utilizing a signal processing component to control port(s) of a configurable cellular antenna array (e.g., comprising a group of modular cellular antenna panels for M-MIMO based communications) to mitigate PIM interference.

For example, in embodiment(s), a base station device, e.g., wireless access point (AP), eNodeB (eNB), network equipment, etc. comprises a signal processing component comprising a PIM interference component and an antenna configuration component. The PIM interference component determines PIM interference corresponding to uplink signals that have been received, via a configurable cellular antenna array of the base station device, from respective wireless devices of a group of wireless devices that have been communicatively coupled to the base station device. In turn, the antenna configuration component selects a defined configuration of a group of cellular antenna ports of the configurable cellular array to facilitate a reduction of the PIM interference corresponding to the uplink signals.

In an embodiment, the PIM interference component determines the PIM interference by determining, during uplink beam forming, uplink noise that has been incurred on the uplink signals—the uplink noise representing the PIM interference.

In another embodiment, the PIM interference component determines the PIM interference by: enabling, via the configurable cellular antenna array, all available transmit portions of a group of carriers. Further, based on downlink transmissions of the transmit portions of the group of carriers, the PIM interference component determines an observed spectral signature of uplink signals that have been received via the configurable cellular antenna array. In this regard, the spectral signature is a representation of uplink radio frequency (RF) channel characteristics corresponding to the uplink signals with respect to an amplitude of the uplink RF channel versus frequency of the uplink RF channel over a defined period of time, e.g., corresponding to a spectrum analysis of the RF channel.

In turn, the PIM interference component determines a group of ordered products representing a predicted spectral signature that has a defined similarity to the observed spectral signature; based on the predicted spectral signature, selects an interference portion of carriers of the group of carriers that have been determined to have contributed to the PIM interference; and determines an associated portion of cellular antenna ports of the group of cellular antenna ports corresponding to the interference portion of carriers.

Further, the antenna configuration component selects the defined configuration of the group of cellular antenna ports by: selecting a remaining portion of cellular antenna ports of the group of cellular antenna ports that does not include the associated portion of cellular antenna ports corresponding to the interference portion of carriers; and receives, via the remaining portion of cellular antenna ports, other uplink signals from the respective wireless devices to facilitate the reduction of the PIM interference.

In other embodiment(s), the antenna configuration component selects the defined configuration of the group of cellular antenna ports by: reconfiguring a portion of cellular antenna ports of the group of cellular antenna ports corresponding to the downlink channel to facilitate an increase of an uplink communication range of an uplink channel corresponding to the uplink signals in response to a determination that the uplink communication range of the uplink channel is lower than a downlink communication range of a downlink channel corresponding to downlink sector beams that have been transmitted to the group of wireless devices.

In this regard, in yet other embodiment(s), the antenna configuration component reconfigures the portion of the cellular antenna ports by: disabling the portion of cellular antenna ports corresponding to the downlink channel to facilitate the increase of the uplink communication range.

In embodiment(s), the antenna configuration component comprises a beam component that modifies respective properties of an uplink beam corresponding to an uplink channel associated with the uplink signals, a downlink sector beam of the downlink sector beams, and/or a port of the group of cellular antenna ports to facilitate the reduction of the PIM interference.

In this regard, in other embodiment(s), the respective properties of the uplink beam, the downlink sector beam, or the port comprise: a polarization of the uplink beam, the downlink sector beam, and/or the port; a bandwidth portion of the uplink beam, the downlink sector beam, and/or the port; a direction of the downlink sector beam with respect to a phase of the downlink sector beam corresponding to a transmission frequency of the downlink sector beam; and/or an amplitude of the downlink sector beam.

In embodiment(s), the antenna configuration component comprises a port selection component that selects the defined configuration of the group of cellular antenna ports by selecting a portion of cellular antenna ports from the group of cellular antenna ports for transmission of downlink sector beams to the group of wireless devices to facilitate the reduction of the PIM interference. In turn, the signal processing component transmits, via the portion of cellular antenna ports, the downlink sector beams to the group of wireless devices to facilitate the reduction of the PIM interference.

In other embodiment(s), the antenna configuration component comprises a transmission power component that modifies respective transmission powers of at least a portion of cellular antenna ports of the group of cellular antenna ports for transmission of downlink sector beams to the group of wireless devices to facilitate the reduction of the passive intermodulation interference. In turn, the signal processing component transmits, via the portion of cellular antenna ports, the downlink sector beams to the group of wireless devices to facilitate the reduction of the PIM interference.

In yet other embodiment(s), the antenna configuration component comprises a tilt component that modifies respective elevations, tilts, etc. of at least a portion of cellular antenna ports of the group of cellular antenna ports for transmission of downlink sector beams to the group of wireless devices to facilitate the reduction of the PIM interference. In turn, the signal processing component transmits, via the portion of cellular antenna ports, the downlink sector beams to the group of wireless devices to facilitate the reduction of the PIM interference.

In embodiment(s), the antenna configuration component comprises an azimuth component that modifies respective azimuths of at least a portion of cellular antenna ports of the group of cellular antenna ports for transmission of downlink sector beams to the group of wireless devices to facilitate the reduction of the PIM interference. In turn, the signal processing component transmits, via the portion of cellular antenna ports, the downlink sector beams to the group of wireless devices to facilitate the reduction of the PIM interference.

In embodiment(s), the antenna configuration component selects the defined configuration of the group of cellular antenna ports by: modifying a number of downlink sector beams that are included in a group of downlink sector beams for transmission of the group of downlink sector beams to the group of wireless devices to facilitate the reduction of the PIM interference.

In an embodiment, a method comprises: determining, by a network equipment comprising a processor, PIM interference corresponding to uplink signals that have been received, via ports of an antenna array of the network equipment, from respective user equipment devices that have been communicatively coupled to the network equipment; and configuring, by the network equipment, the ports of the antenna array to facilitate a reduction of the PIM interference.

In one embodiment, the configuring of the ports of the antenna array comprises: in response to the ports of the antenna array being loaded with all available transmit portions of a group of carriers, determining an observed spectral signature of uplink signals that have been received from the respective user equipment devices via the ports of the antenna array; determining a group of ordered products representing a predicted spectral signature that has a defined similarity to the observed spectral signature; based on the predicted spectral signature, selecting an interference portion of carriers of the group of carriers that have been determined to have contributed to the passive intermodulation interference; and in response to a first portion of the ports of the antenna array being determined to correspond to the interference portion of carriers, selecting a second portion of the ports that does not include the first portion for reception of other uplink signals from the respective user equipment devices to facilitate the reduction of the PIM interference.

In another embodiment, the configuring of the ports of the antenna array comprises: in response to determining that an uplink communication range of an uplink channel corresponding to the uplink signals has been degraded with respect to a downlink communication range of a downlink channel corresponding to downlink sector beams that have been transmitted to the respective user equipment devices, reconfiguring a portion of the ports of the antenna array corresponding to the downlink channel to facilitate an improvement of the uplink communication range.

In yet another embodiment, the configuring of the ports of the antenna array comprises selecting a portion of the ports of the antenna array for reception of uplink beams from the respective user equipment devices or for transmission of downlink sector beams to the respective user equipment devices to facilitate the reduction of the PIM interference.

In embodiment(s), the configuring of the ports of the antenna array comprises: modifying an uplink beam corresponding to the uplink signals, a downlink sector beam of a group of downlink sector beams to be transmitted to user equipment device(s) of the respective user equipment devices, and/or a port of the ports to facilitate the reduction of the PIM interference.

In this regard, the modifying of the uplink beam or the downlink sector beam comprises modifying: a polarization of the uplink beam or the downlink sector beam; a frequency of the downlink sector beam; a direction of the downlink sector beam with respect to a phase of the downlink sector beam corresponding to a transmission frequency of the downlink sector beam; and/or an amplitude of the downlink sector beam.

In another embodiment, a machine-readable medium comprises executable instructions that, when executed by a base station device comprising a processor, facilitate performance of operations, comprising: determining PIM interference corresponding to uplink signals that have been received, via respective ports of a cellular antenna array of the base station device, from respective wireless devices communicatively coupled to the base station device; and determining configurations of the respective ports to facilitate mitigation of the PIM interference.

In yet another embodiment, the determining of the configurations of the respective ports to facilitate the mitigation of the PIM interference comprises: selecting a first portion of the respective ports for reception of other uplink signals from the respective wireless devices; selecting a second portion of the respective ports for transmission of downlink sector beams from the respective ports to the respective wireless devices; modifying a transmission power of a port of the respective ports; modifying a tilt of the port, modifying an azimuth of the port; modifying a number of the downlink sector beams that are transmitted from the respective ports to the respective wireless devices; and/or modifying an uplink beam corresponding to the uplink signals, a downlink sector beam of the downlink sector beams, and/or a port of the respective ports to facilitate the mitigation of the passive intermodulation interference.

In embodiment(s), the modifying of the uplink beam, the downlink sector beam, and/or the port comprises modifying: a polarization of the uplink beam, the downlink sector beam, and/or the port; a bandwidth portion of the uplink beam, the downlink sector beam, and/or the port; a frequency of the downlink sector beam; a direction of the downlink sector beam with respect to a phase of the downlink sector beam corresponding to a transmission frequency of the downlink sector beam; and/or an amplitude of the downlink sector beam.

Reference throughout this specification to "one embodiment," "an embodiment," etc. means that a particular feature, structure, or characteristic described in connection with the embodiment is included in at least one embodiment. Thus, the appearances of the phrase "in one embodiment," "in an embodiment," etc. in various places throughout this specification are not necessarily all referring to the same embodiment. Furthermore, the particular features, structures, or characteristics may be combined in any suitable manner in one or more embodiments.

As described above, conventional cellular technologies have had some drawbacks with respect to reducing PIM interference. For example, such technologies utilize manual means to remove PIM sources identified by CPRI based tools, which is tedious, labor intensive, and costly. To address these and other concerns of conventional cellular technologies, various embodiments disclosed herein can reduce PIM interference by utilizing a signal processing component to configure ports of a cellular antenna array, e.g., to configure uplink beam(s) corresponding to the ports, downlink beam(s) corresponding to the ports, etc. to mitigate PIM interference.

Figure 2:
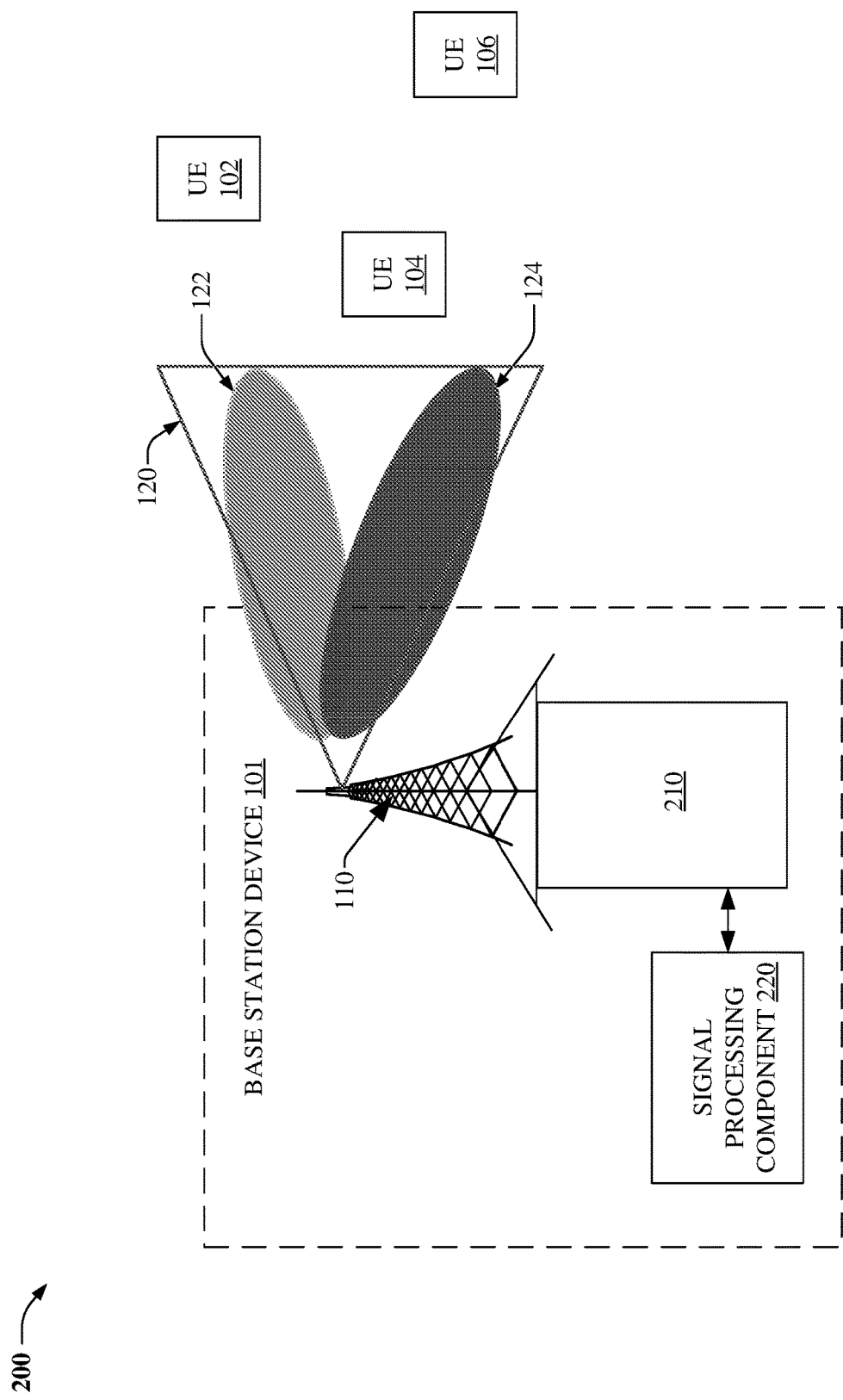
FIG. 2 illustrates a block diagram of a cellular system comprising a base station device comprising a signal processing component for performing port reconfiguration of a configurable cellular antenna array of the base station device for PIM interference mitigation, in accordance with various example embodiments.
Figure 3:
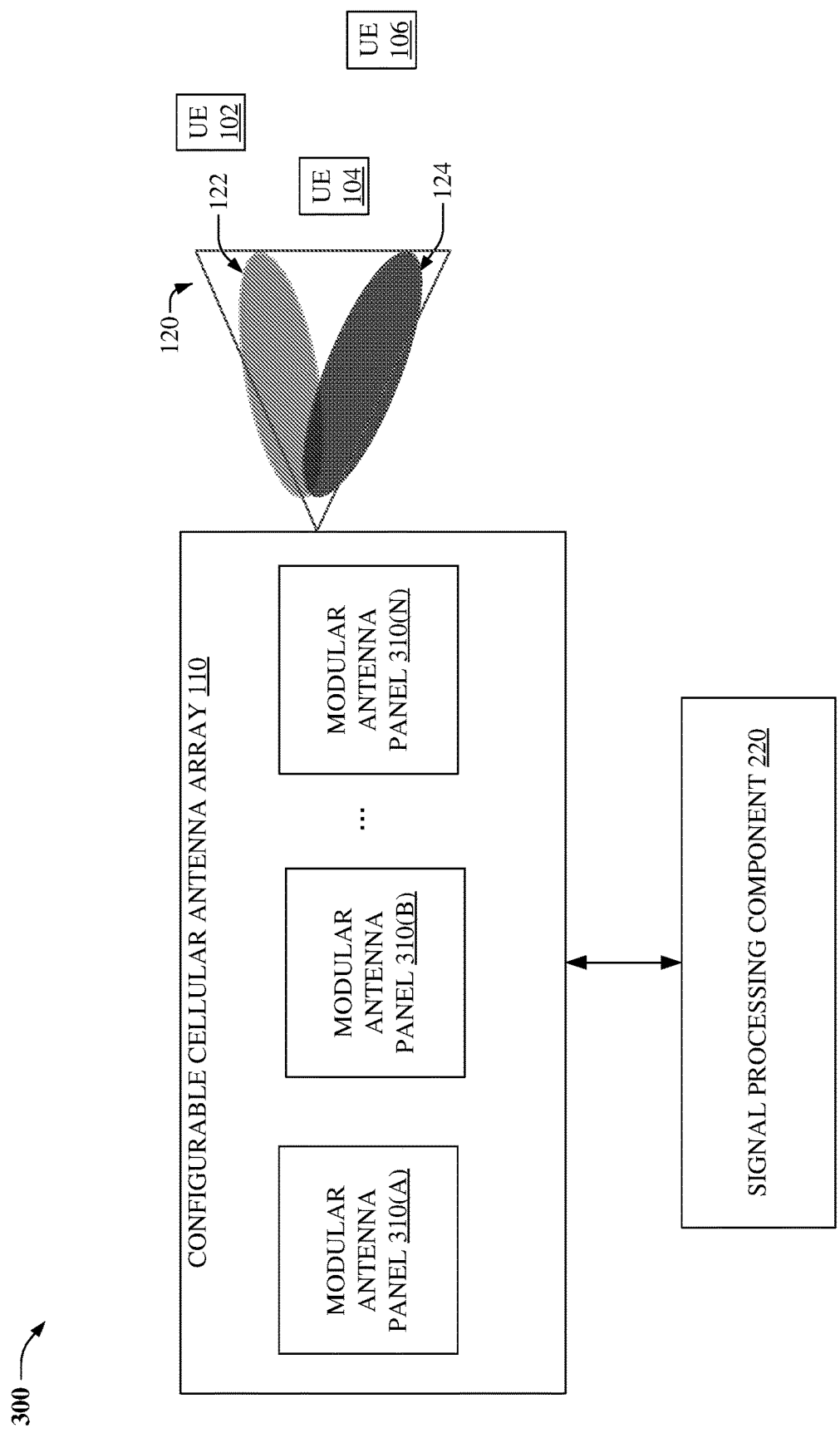
FIG. 3 illustrates a block diagram of a base station device comprising a signal processing component that performs port reconfiguration of a configurable cellular antenna array of the base station device for PIM interference mitigation, in accordance with various example embodiments.

Now referring to FIGS. 1-3, block diagrams of a cellular system (100) comprising a base station device (101), e.g., network equipment, that performs port reconfiguration of a configurable cellular antenna array (110) for PIM interference mitigation; a cellular system (200) comprising a base station device comprising a signal processing component (220) for performing port reconfiguration of a configurable cellular antenna array (110) for PIM interference mitigation; and a configurable cellular antenna array (110) comprising a group of modular cellular antenna panels (310(A) to 310(N)) for M-MIMO communication are illustrated, respectively, in accordance with various example embodiments.

As illustrated by FIGS. 1-3, in embodiment(s), a base station device (101), e.g., wireless access point (AP), eNodeB (eNB), network equipment, etc. comprises a configurable cellular antenna array (110) that has been placed at a first location, e.g., cellular tower, structure, rooftop of a building (210), etc. The configurable cellular antenna array comprising modular antenna panels (310(A), 310(B), 310(N)) to facilitate reception of uplink signals from respective wireless devices of a group of wireless devices (user equipment (UE) 102, UE 104, UE 106), and to facilitate transmission of a group of downlink sector beams (122, 124) to the group of wireless devices.

The base station device comprises a signal processing component (220) that has been optically coupled to the configurable cellular antenna array to facilitate the reception of the uplink signals and generation of the group of downlink sector beams. In embodiment(s), the signal processing component is placed at a second location, e.g., of the building, a remote location, ground level, etc. that is different from the first location to facilitate a reduction of wind loading of the configurable cellular antenna array.

Figure 4:
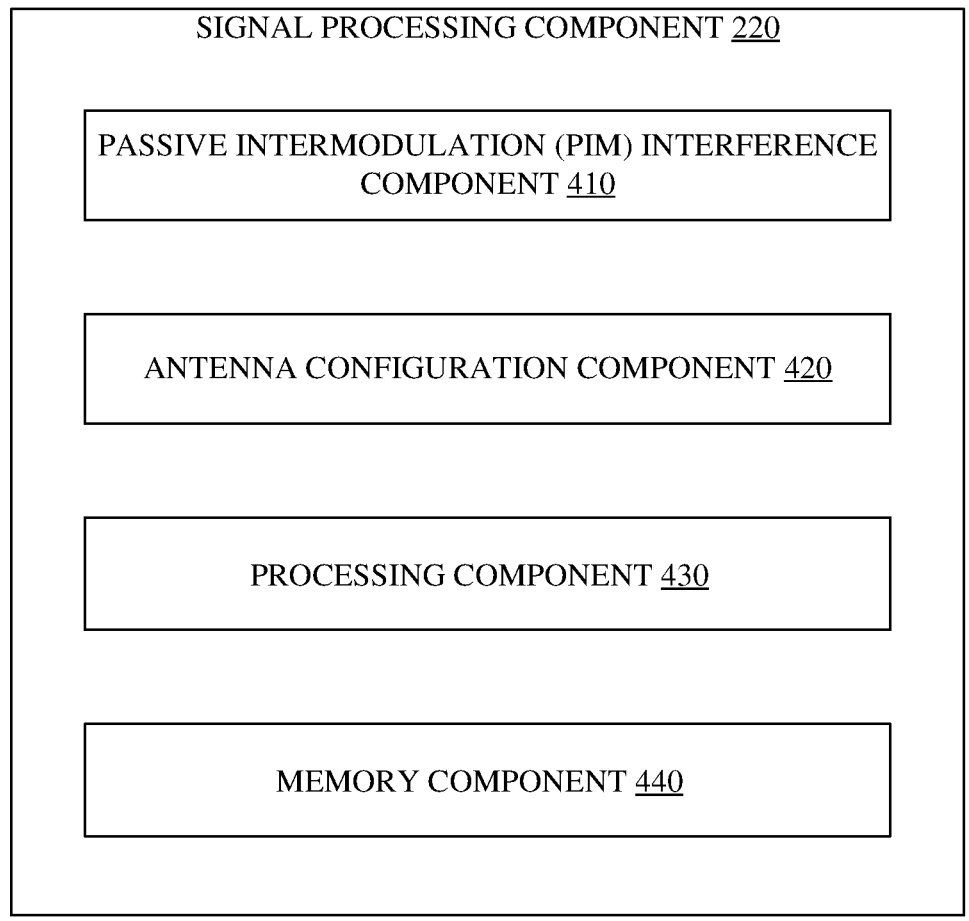
FIG. 4 illustrates a block diagram of a signal processing component of a base station device that performs port reconfiguration of a configurable cellular antenna array of the base station device for PIM interference mitigation, in accordance with various example embodiments, in accordance with various example embodiments.

Now referring to FIG. 4, the signal processing component comprises a PIM interference component (410), an antenna configuration component (420), a processing component (430), and a memory component (440). The PIM interference component determines PIM interference corresponding to uplink signals (not shown) that have been received, via the configurable cellular antenna array, from respective wireless devices of the group of wireless devices that have been communicatively coupled to the base station device. In turn, the antenna configuration component selects a defined configuration of the group of cellular antenna ports of the configurable cellular array to facilitate a reduction of the PIM interference corresponding to the uplink signals.

In an embodiment, the PIM interference component determines the PIM interference by determining, during uplink beam forming, uplink noise that has been incurred on the uplink signals—the uplink noise representing the PIM interference.

For example, in embodiment(s), the PIM interference component determines the PIM interference by enabling, via the configurable cellular antenna array, all available transmit portions of a group of carriers. Further, based on downlink transmissions of the transmit portions of the group of carriers, the PIM interference component determines an observed spectral signature of uplink signals that have been received via the configurable cellular antenna array. In this regard, the spectral signature is a representation of uplink RF channel characteristics corresponding to the uplink signals with respect to an amplitude of the uplink RF channel versus frequency of the uplink RF channel over a defined period of time, e.g., corresponding to a spectrum analysis of the RF channel.

In turn, the PIM interference component determines a group of ordered products representing a predicted spectral signature that has a defined similarity to the observed spectral signature. Further, based on the predicted spectral signature, the PIM interference component selects an interference portion of carriers of the group of carriers that have been determined to have contributed to the PIM interference, and determines an associated portion of cellular antenna ports of the group of cellular antenna ports corresponding to the interference portion of carriers.

In an embodiment, the antenna configuration component selects the defined configuration of the group of cellular antenna ports by selecting a remaining portion of cellular antenna ports of the group of cellular antenna ports that does not include the associated portion of cellular antenna ports corresponding to the interference portion of carriers. In turn, the signal processing component receives, via the remaining portion of cellular antenna ports, other uplink signals from the respective wireless devices to facilitate the reduction of the PIM interference.

In other embodiment(s), in response to a determination that the uplink communication range of the uplink channel is lower than a downlink communication range of a downlink channel corresponding to downlink sector beams that have been transmitted to the group of wireless devices, the antenna configuration component selects the defined configuration of the group of cellular antenna ports by reconfiguring a portion of cellular antenna ports of the group of cellular antenna ports corresponding to the downlink channel to facilitate an increase of an uplink communication range of an uplink channel corresponding to the uplink signals.

For example, in an embodiment, the antenna configuration component reconfigures the portion of the cellular antenna ports by disabling the portion of cellular antenna ports corresponding to the downlink channel to facilitate the increase of the uplink communication range.

Figure 5:
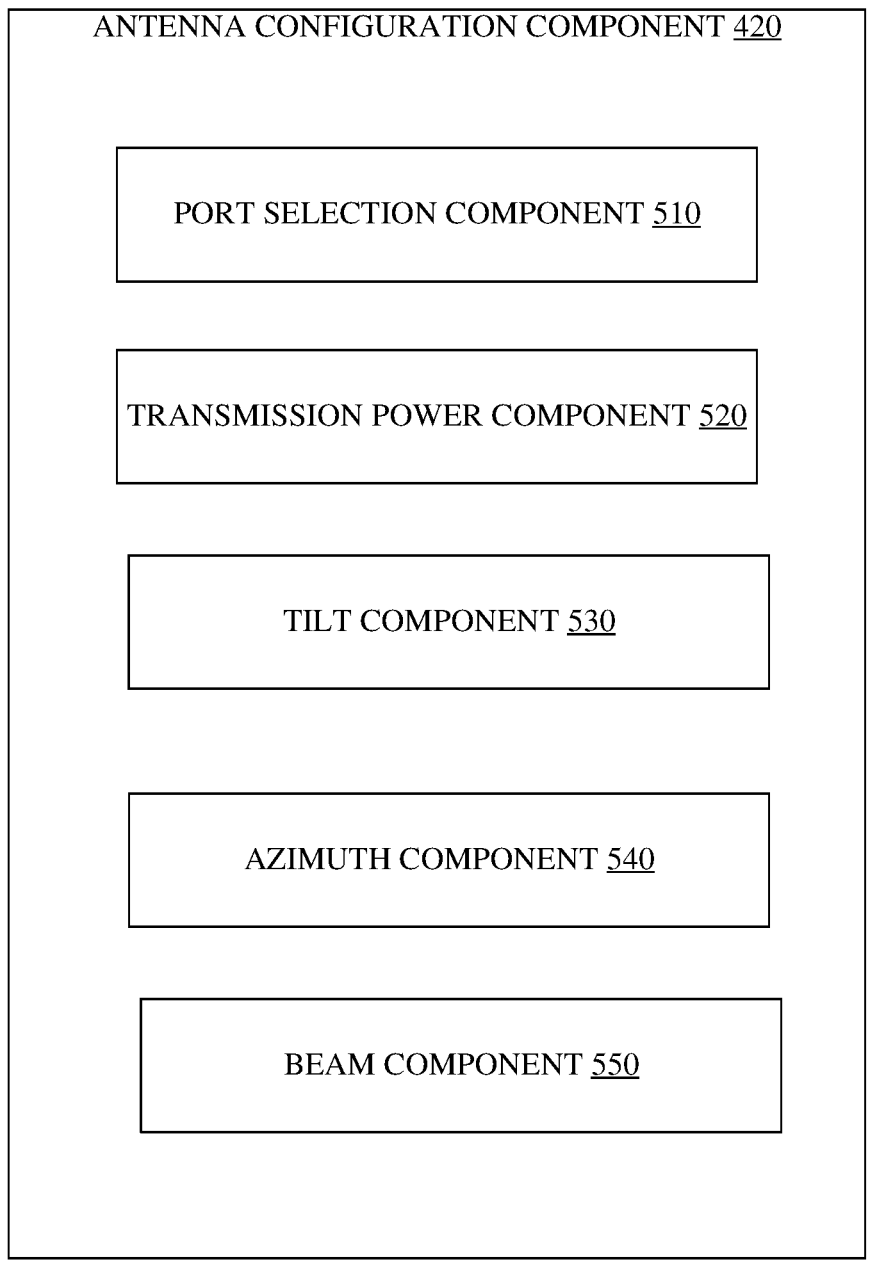
FIG. 5 illustrates a block diagram of an antenna configuration component for controlling a configurable cellular antenna array of the base station device for PIM interference mitigation, in accordance with various example embodiments.
Figure 6:
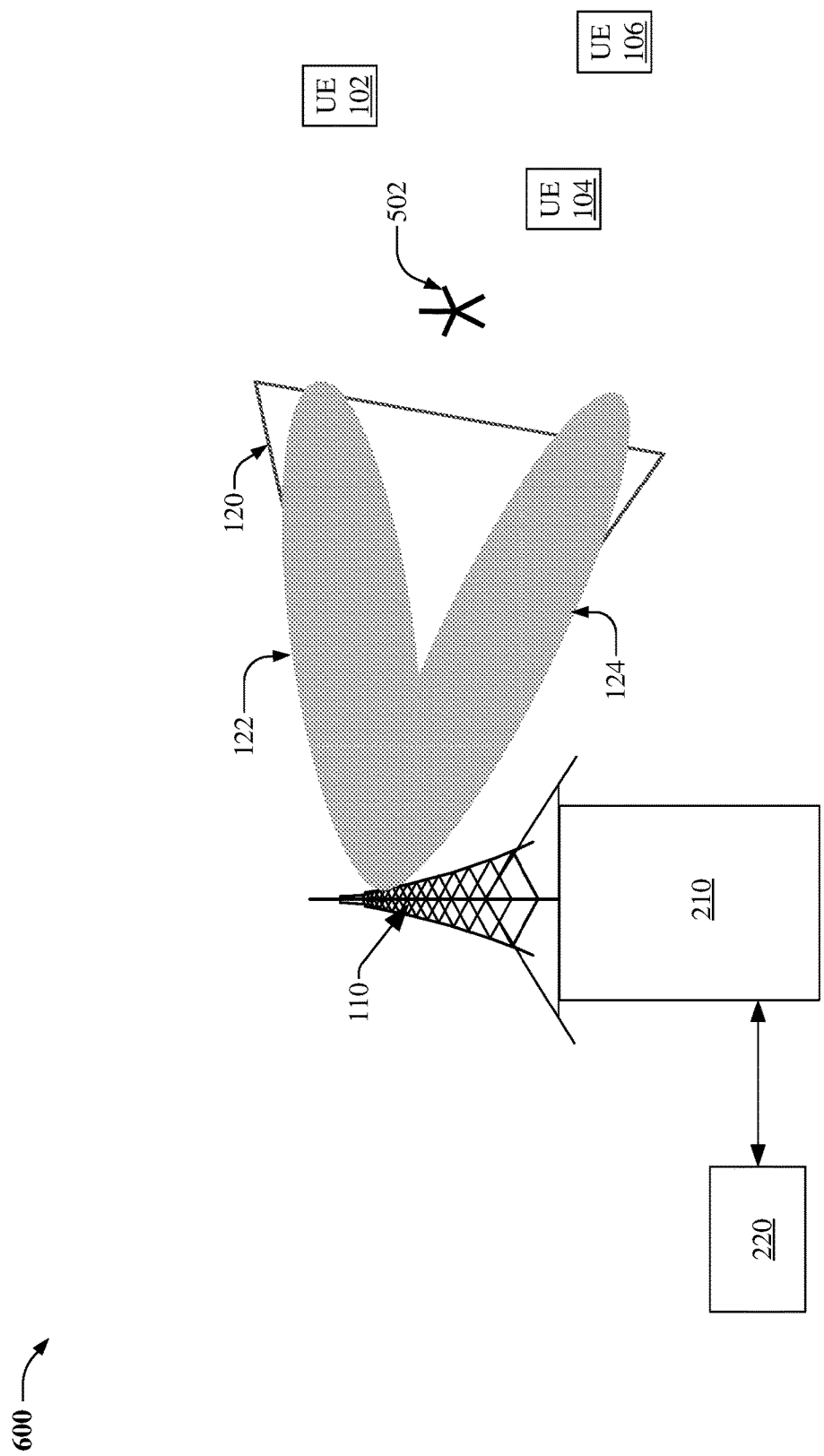
FIG. 6 illustrates a block diagram of a cellular system comprising a base station device in which port reconfiguration has been performed to facilitate mitigation of PIM interference corresponding to a PIM source, in accordance with various example embodiments.

Now referring to FIGS. 5 and 6, in embodiment(s), the antenna configuration component comprises a port selection component (510), a transmission power component (520), a tilt component (530), an azimuth component (540), and a beam component (550).

In embodiment(s), the beam component modifies respective properties of an uplink beam corresponding to an uplink channel associated with the uplink signals, a downlink sector beam of the downlink sector beams, and/or a port of the group of cellular antenna ports to facilitate the reduction of the PIM interference.

In this regard, the respective properties of the uplink beam, the downlink sector beam, or the port comprise: a polarization of the uplink beam, the downlink sector beam, and/or the port; a bandwidth portion of the uplink beam, the downlink sector beam, and/or the port; a direction of the downlink sector beam with respect to a phase of the downlink sector beam corresponding to a transmission frequency of the downlink sector beam; and/or an amplitude of the downlink sector beam.

In an embodiment, the beam component can change a shape of the uplink beam or the downlink sector beam to be narrower or fatter. In another embodiment, the beam component can modify lobes, an amount of the lobes, etc. that are included in the uplink beam or the downlink sector beam. In yet another embodiment, the beam component can modify a number of nulls that are included in the uplink beam or the downlink sector beam.

In embodiment(s), the beam component modifies a number of downlink sector beams that are included in a group of downlink sector beams for transmission, via the group of cellular antenna ports, to the group of wireless devices to facilitate the reduction of the PIM interference corresponding to the uplink signals. Further, based on the modification of the number of downlink sector beams that are included in the group of downlink sector beams, the signal processing component transmits, via the group of cellular antenna ports, the group of downlink sector beams to the group of wireless devices to facilitate the reduction of the PIM interference corresponding to the uplink signals.

In other embodiments, the beam component performs "digital sectorization" of a sector (120) by dividing the sector into respective, e.g., two, sectors, and generates downlink sector beams 122 and 124 corresponding to the respective sectors and having beam widths of approximately 40 degrees.

In an embodiment, the port selection component selects a portion (e.g., 2 out of 4, etc.) of cellular antenna ports from the group of cellular antenna ports for transmission of downlink sector beams (e.g., 122, 124) to the group of wireless devices to facilitate the reduction of the PIM interference corresponding to the uplink signals, e.g., the PIM interference being caused on the uplink signals by a PIM source (502). In turn, the signal processing component transmits, via the portion of the cellular antenna ports, the downlink sector beams to the group of wireless devices to facilitate the reduction of the PIM interference on the uplink signals that has been caused by the PIM source.

In other embodiment(s), the transmission power component modifies respective transmission powers of at least a portion of cellular antenna ports of the group of cellular antenna ports for transmission of downlink sector beams to the group of wireless devices to facilitate the reduction of the passive intermodulation interference. In turn, the signal processing component transmits, via the portion of cellular antenna ports, the downlink sector beams to the group of wireless devices to facilitate the reduction of the PIM interference.

In yet other embodiment(s), the tilt component modifies respective elevations, tilts, etc. of portion(s) of cellular antenna ports of the group of cellular antenna ports for transmission of the downlink sector beams to the group of wireless devices to facilitate the reduction of the PIM interference corresponding to the uplink signals. In turn, based on the modification of the respective elevations, tilts, etc., the signal processing component transmits, via the group of cellular antenna ports, the downlink sector beams to the group of wireless devices to facilitate the reduction of the PIM interference.

In embodiment(s), the azimuth component modifies respective azimuths of portion(s) of cellular antenna ports of the group of cellular antenna ports for transmission of downlink sector beams to the group of wireless devices to facilitate the reduction of the PIM interference corresponding to the uplink signals. Further, based on the modification of the respective azimuths, the signal processing component transmits, via the group of cellular antenna ports, the downlink sector beams to the group of wireless devices to facilitate the reduction of the PIM interference.

It should be appreciated by a person of ordinary skill in the art of cellular technologies having the benefit of the instant disclosure that the antenna configuration component can modify various combinations of defined configurations of the group of cellular antenna ports, e.g., respective properties of uplink beam(s), downlink sector beam(s), etc. to facilitate the reduction of the PIM interference corresponding to the uplink signals, e.g., modifying one or more of: a polarization of the uplink beam(s), a polarization of the downlink sector beam(s); a bandwidth portion of the uplink beam(s), a bandwidth portion of the downlink sector beam(s); a selection of ports for transmission and/or reception of signals to/from the group of wireless devices; transmission power(s) of respective cellular antenna ports of the group of cellular antenna ports for transmission of downlink sector beams to the group of wireless devices; elevation(s)/tilt(s) of the respective cellular antenna ports for reception of uplink beams and/or the transmission of the downlink sector beams to the group of wireless devices; azimuth(s) of the respective cellular antenna ports for the reception of the uplink beams and/or the transmission of the downlink sector beams to the group of wireless devices; shape(s) of the uplink beams and/or the respective downlink sector beam(s) of the downlink sector beams; and/or a number of downlink sector beams that are included in a group of downlink sector beams for transmission to the group of wireless devices.

In embodiment(s), the modular cellular antenna panels are identical, e.g., each modular cellular antenna panel comprising defined common attribute(s) with respect to, e.g., shape, dimension, size, number of antenna elements, etc.—such common attributes enabling a defined number of modular antenna panels to be connected, coupled, etc. together in a "plug-and-play" manner, e.g., to form, in combination, a unified, combined, etc. cellular antenna of configurable size, configurable number of antenna elements, etc.

Figure 7:
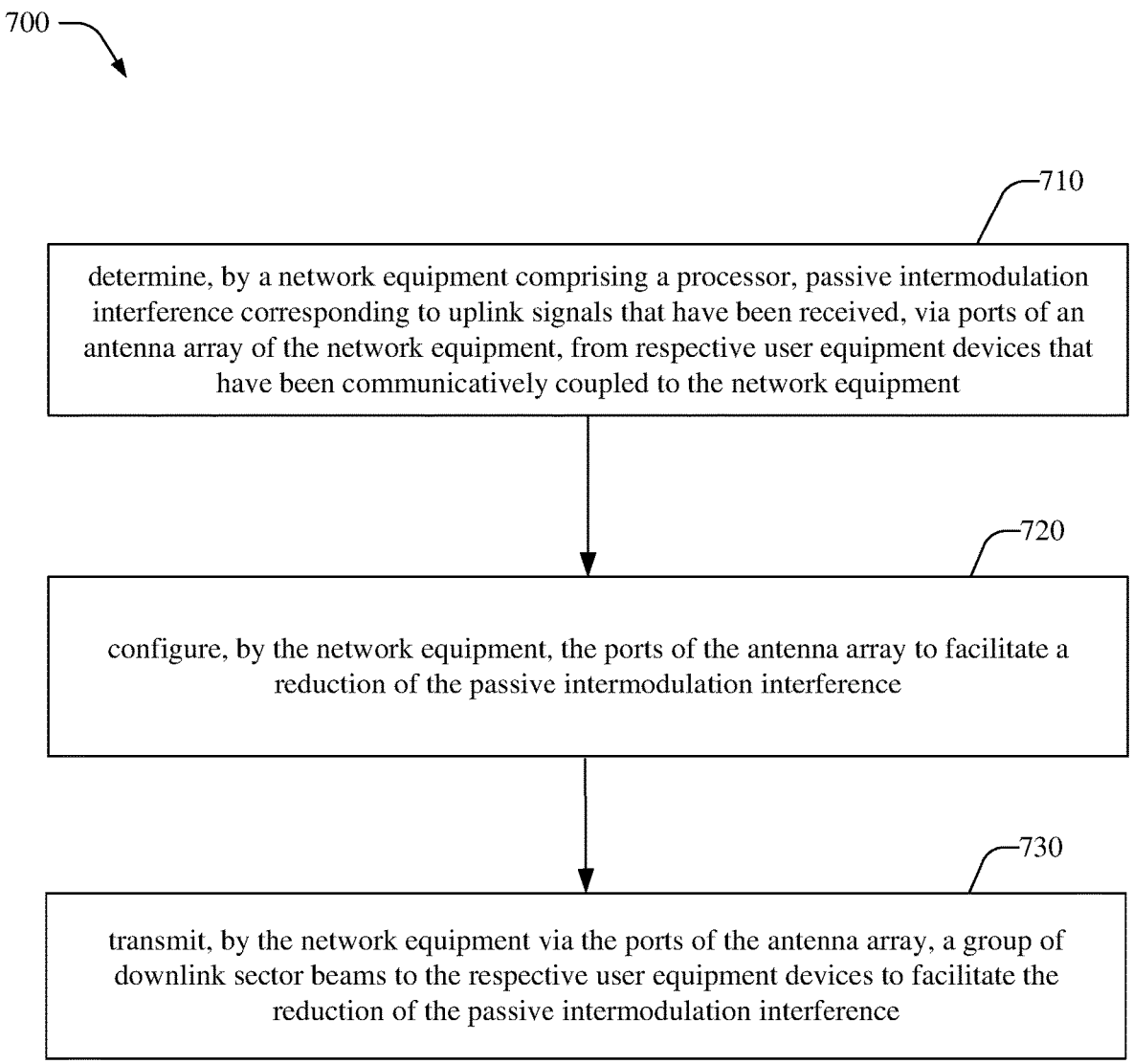
FIG. 7 illustrates a flow chart of a method associated with reconfiguration of a cellular antenna array for PIM interference mitigation, in accordance with various example embodiments.
Figure 8:
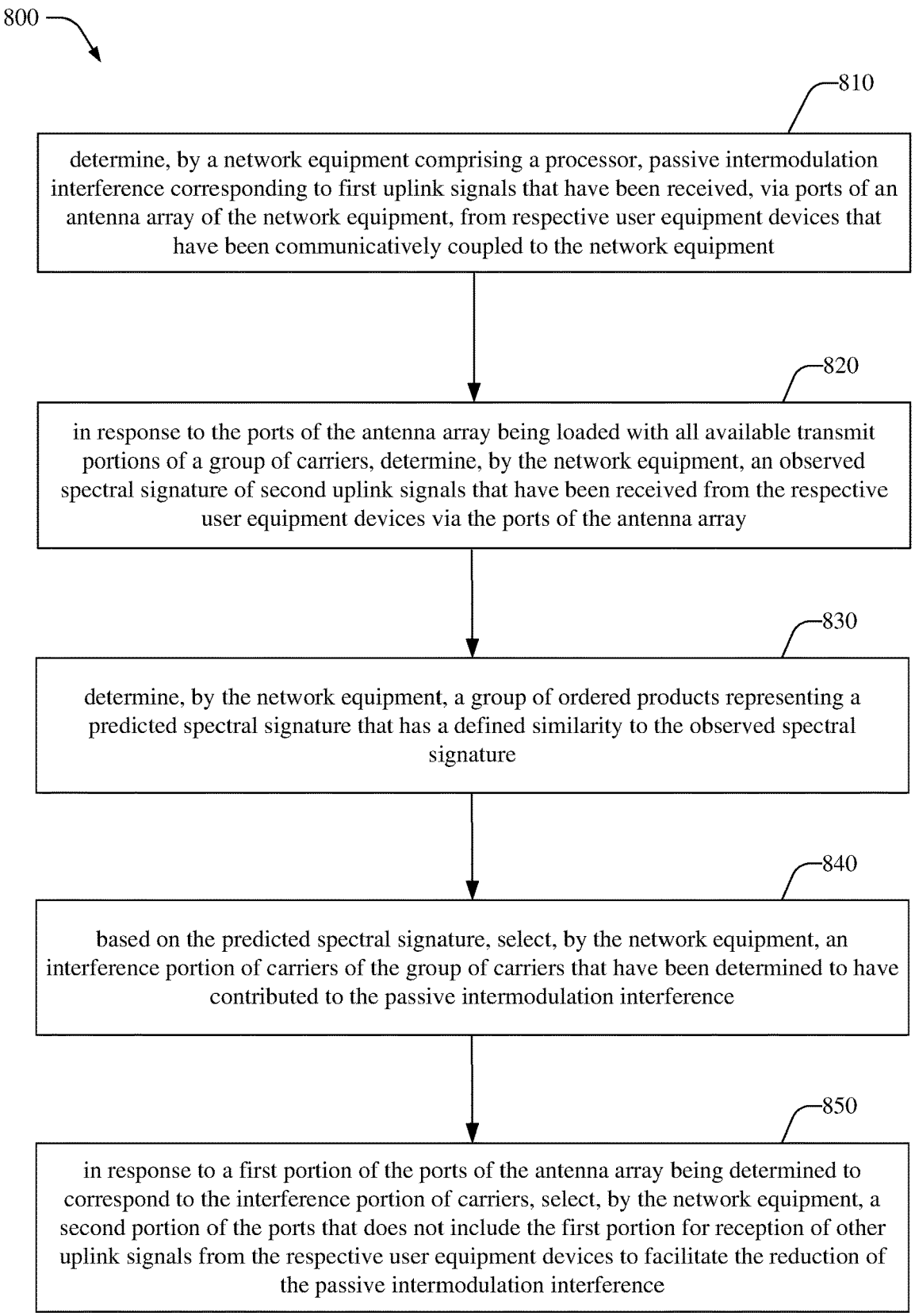
FIG. 8 illustrates a flowchart of another method associated with reconfiguration of a cellular antenna array for PIM interference mitigation, in accordance with various example embodiments.
Figure 9:
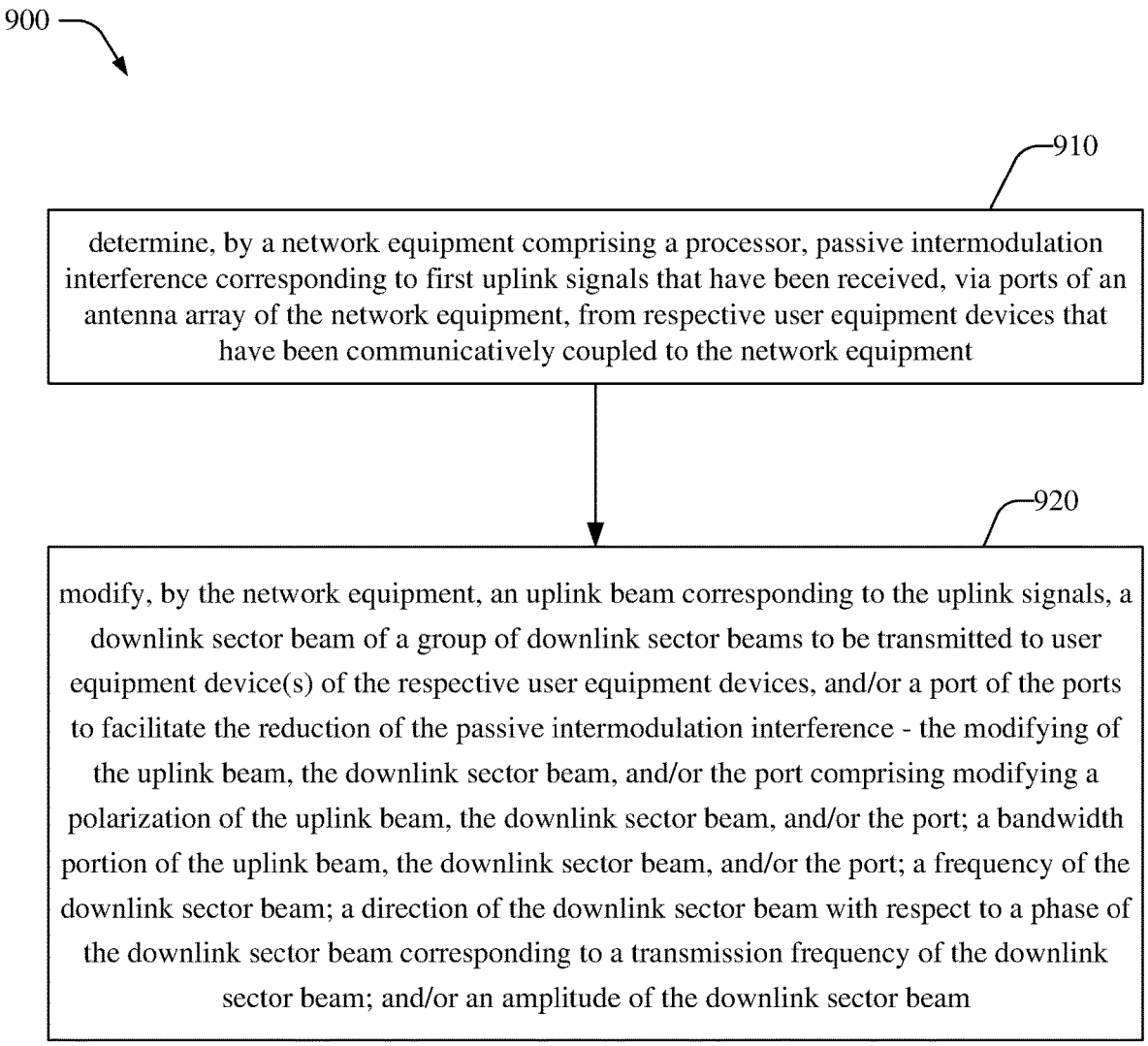
FIG. 9 illustrates a flowchart of yet another method associated with reconfiguration of a cellular antenna array for PIM interference mitigation, in accordance with various example embodiments.

FIGS. 7-9 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, a flowchart of a method (700) associated with reconfiguration of a cellular antenna array for PIM interference mitigation is illustrated, in accordance with various example embodiments. At 710, a base station device (101), network equipment, etc. comprising a processor, determines PIM interference corresponding to uplink signals that have been received, via ports of an antenna array of the base station device, from respective user equipment devices that have been communicatively coupled to the base station device.

At 720, the network equipment configures ports of the antenna array to facilitate a reduction of the PIM interference. At 730, the network equipment transmits, e.g., via the configured ports of the antenna array, a group of downlink sector beams to the respective user equipment devices to facilitate the reduction of the PIM interference.

FIG. 8 illustrates a flowchart of another method (800) associated with reconfiguration of a cellular antenna array for PIM interference mitigation, in accordance with various example embodiments. At 810, the base station device (101), e.g., network equipment, determines PIM interference corresponding to first uplink signals that have been received, via ports of the antenna array of the network equipment, from respective user equipment devices that have been communicatively coupled to the network equipment.

At 820, in response to the ports of the antenna array being loaded with all available transmit portions of a group of carriers, the network equipment determines an observed spectral signature of second uplink signals that have been received from the respective user equipment devices via the ports of the antenna array. In this regard, the spectral signature is a representation of uplink RF channel characteristics corresponding to the second uplink signals with respect to an amplitude of the uplink RF channel versus frequency of the uplink RF channel over a defined period of time, e.g., corresponding to a spectrum analysis of the RF channel.

At 830, the network equipment determines a group of ordered products representing a predicted spectral signature that has a defined similarity to the observed spectral signature. At 840, based on the predicted spectral signature, the network equipment selects an interference portion of carriers of the group of carriers that have been determined to have contributed to the passive intermodulation interference.

In turn, at 850, in response to a first portion of the ports of the antenna array being determined to correspond to the interference portion of carriers, the network equipment selects a second portion of the ports that does not include the first portion for reception of other uplink signals from the respective user equipment devices to facilitate the reduction of the passive intermodulation interference.

FIG. 9 illustrates yet another method (900) associated with reconfiguration of a cellular antenna array for PIM interference mitigation, in accordance with various example embodiments. At 910, the base station device (101), e.g., network equipment, determines PIM interference corresponding to uplink signals that have been received, via ports of the antenna array of the network equipment, from respective user equipment devices that have been communicatively coupled to the network equipment.

At 920, the network equipment modifies an uplink beam corresponding to the uplink signals, a downlink sector beam of a group of downlink sector beams to be transmitted to user equipment device(s) of the respective user equipment devices, and/or a port of the ports to facilitate the reduction of the passive intermodulation interference—the modifying of the uplink beam, the downlink sector beam, and/or the port comprising modifying a polarization of the uplink beam, the downlink sector beam, and/or the port; a bandwidth portion of the uplink beam, the downlink sector beam, and/or the port; a frequency of the downlink sector beam, a direction of the downlink sector beam with respect to a phase of the downlink sector beam corresponding to a transmission frequency of the downlink sector beam, and/or an amplitude of the downlink sector beam.

Figure 10:
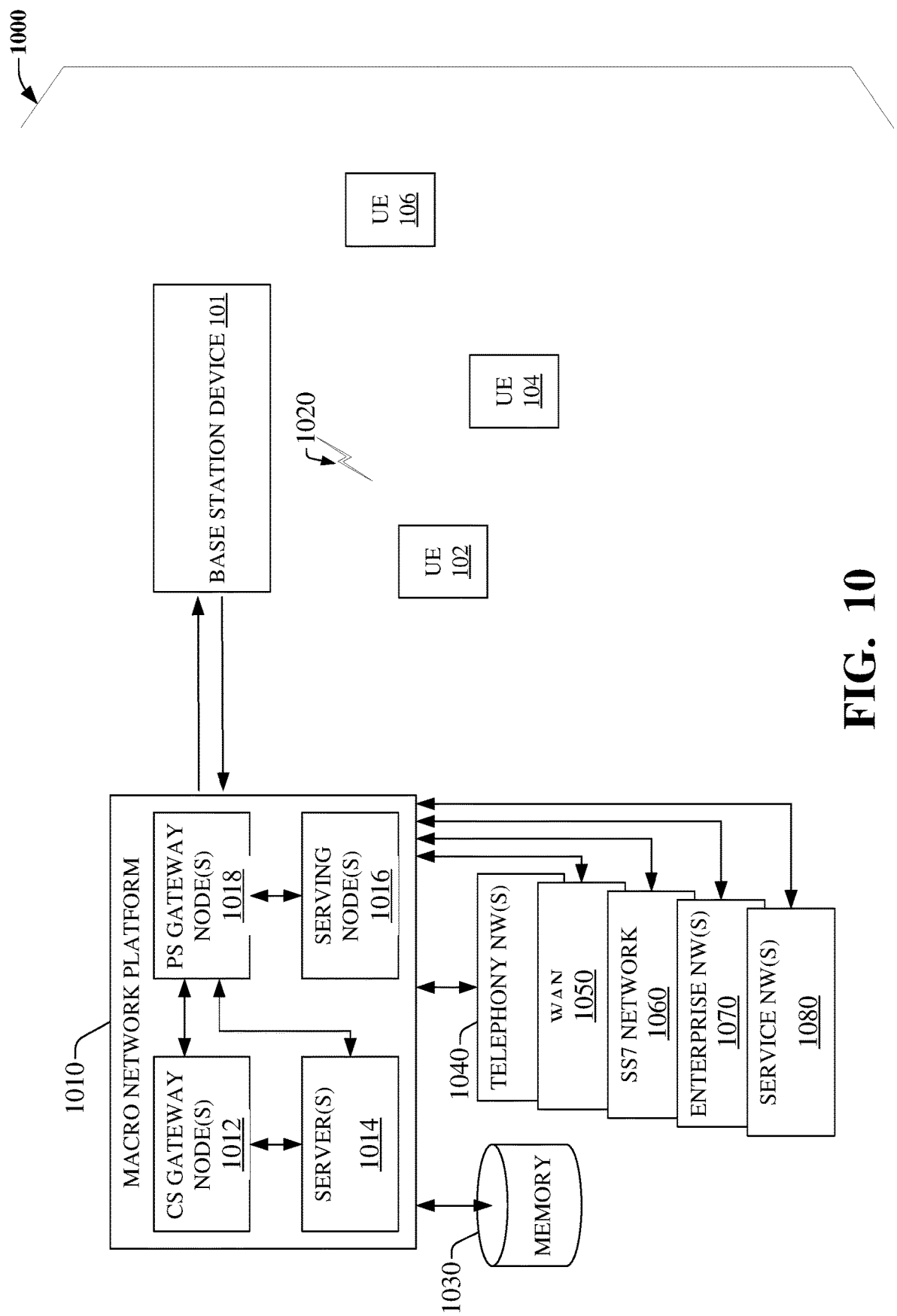
FIG. 10 illustrates a block diagram of a wireless network environment, in accordance various example embodiments.

With respect to FIG. 10, a wireless communication environment 1000 including macro network platform 1010 is illustrated, in accordance with various embodiments. Macro network platform 1010 serves or facilitates communication with a device (102, 104, 106) via a cellular system (100). It should be appreciated that in cellular wireless technologies, e.g., 3GPP UMTS, high speed packet access (HSPA), 3GPP LTE, third generation partnership project 2 (3GPP2), ultra-mobile broadband (UMB), LTE-A, 5G, etc. that can be associated with the cellular system, macro network platform 1010 can be embodied in a core network. It is noted that the cellular system can include base station(s), base transceiver station(s), access point(s), network equipment(s), etc. (e.g., 101, eNBs, gNBs, etc.) and associated electronic circuitry and deployment site(s), in addition to a wireless radio link (1020), e.g., 122,124, uplink signals, etc. operated in accordance with the base station(s), etc. Accordingly, the cellular system can comprise various coverage cells, or wireless coverage areas. In addition, it should be appreciated that elements and/or components, e.g., of the cellular system, can be located/included within one or more components/elements, e.g., hardware, software, etc., of wireless communication environment 1000, e.g., macro network platform 1010, etc.

Generally, macro network platform 1010 includes components, e.g., nodes, GWs, interfaces, servers, platforms, etc. that facilitate both packet-switched (PS), e.g., IP, frame relay, asynchronous transfer mode (ATM), and circuit-switched (CS) traffic, e.g., voice and data, and control generation for networked wireless communication. In various embodiments, macro network platform 1010 includes CS gateway (GW) node(s) 1012 that can interface CS traffic received from legacy networks like telephony network(s) 1040, e.g., public switched telephone network (PSTN), public land mobile network (PLMN), Signaling System No. 7 (SS7) network 1060, etc. CS GW node(s) 1012 can authorize and authenticate traffic, e.g., voice, arising from such networks. Additionally, CS GW node(s) 1012 can access mobility or roaming data generated through SS7 network 1060; for instance, mobility data stored in a visitor location register (VLR), which can reside in memory 1030. Moreover, CS GW node(s) 1012 interfaces CS-based traffic and signaling with PS GW node(s) 1018. As an example, in a 3GPP UMTS network, PS GW node(s) 1018 can be embodied in GW general packet radio service (GPRS) support node(s) (GGSN).

As illustrated by FIG. 10, PS GW node(s) 1018 can receive and process CS-switched traffic and signaling via CS GW node(s) 1012. Further PS GW node(s) 1018 can authorize and authenticate PS-based data sessions, e.g., via the cellular system, with served devices, communication devices, etc. Such data sessions can include traffic exchange with networks external to macro network platform 1010, like wide area network(s) (WANs) 1050; enterprise networks (NWs) 1070, e.g., E911, service NW(s) 1080, e.g., an IP multimedia subsystem (IMS), etc. It should be appreciated that local area network(s) (LANs), which may be a part of enterprise NW(s) 1070, can also be interfaced with macro network platform 1010 through PS GW node(s) 1018. PS GW node(s) 1018 can generate packet data contexts when a data session is established, e.g., associated with an EPS bearer context activation. To that end, in an aspect, PS GW node(s) 1018 can include a tunnel interface, e.g., tunnel termination GW (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS GW node(s) 1018 (e.g., GGSN) and tunnel interface (e.g., TTG) comprise a packet data GW (PDG).

Macro network platform 1010 also includes serving node(s) 1016 that can convey the various packetized flows of information, or data streams, received through PS GW node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, wireless device management, etc. that can generate multiple disparate packetized data streams or flows; and can manage such flows, e.g., schedule, queue, format. Such application(s), for example, can include add-on features to standard services provided by macro network platform 1010. Data streams can be conveyed to PS GW node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS GW node(s) 1012 and PS GW node(s) 1018 can enact. Moreover, server(s) 1014 can provision services from external network(s), e.g., WAN 1050, or global positioning system (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In wireless communication environment 1000, memory 1030 can store information related to operation of macro network platform 1010, e.g., related to operation of a base station device (e.g., 101), etc. The information can include data, business data, etc. associated with subscribers of respective services; market plans and strategies, e.g., promotional campaigns, business partnerships, mobile devices served through macro network platform, etc.; service and privacy information, policies, etc.; end-user service logs for law enforcement; term(s) and/or condition(s) associated with wireless service(s) provided via the cellular system; and so forth. Memory 1030 can also store information from at least one of telephony network(s) 1040, WAN 1050, SS7 network 1060, enterprise NW(s) 1070, or service NW(s) 1080.

In one or more embodiments, components of wireless communication environment 1000 can provide communication services to the device utilizing an over-the-air wireless link (e.g., 1020) via the cellular system. In this regard, the cellular system can include one or more: macro, Femto, or pico access points (APs) (not shown); base stations (BS) (101); landline networks (e.g., optical landline networks, electrical landline networks) (not shown) communicatively coupled between the device and macro network platform 1010, etc.

Wireless communication environment 1000 can include one or more of the Internet (or another communication network (e.g., IP-based network)), or DSL-type or broadband network facilitated by Ethernet or other technology. In various embodiments, wireless communication environment 1000 can include hardware and/or software for allocating resources to the device and the cellular system, converting or enforcing protocols, establishing and/or providing levels of quality of service (QoS), providing applications or services, translating signals, and/or performing other desired functions to facilitate system interoperability and communication to/from the device and the cellular system.

In other embodiment(s), wireless communication environment 1000 can include data store component(s), a memory configured to store information, computer-readable storage media storing computer-executable instructions, e.g., memory component 440, memory 1030, etc. enabling various operations performed via wireless system as described herein.

As it employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor (e.g., processing component 430) can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store," "memory storage," "memory component", "memory," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory component 440, memory 1030, system memory 1106 (see below), external storage 1116 (see below), and/or memory storage 1152 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM) (1112), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
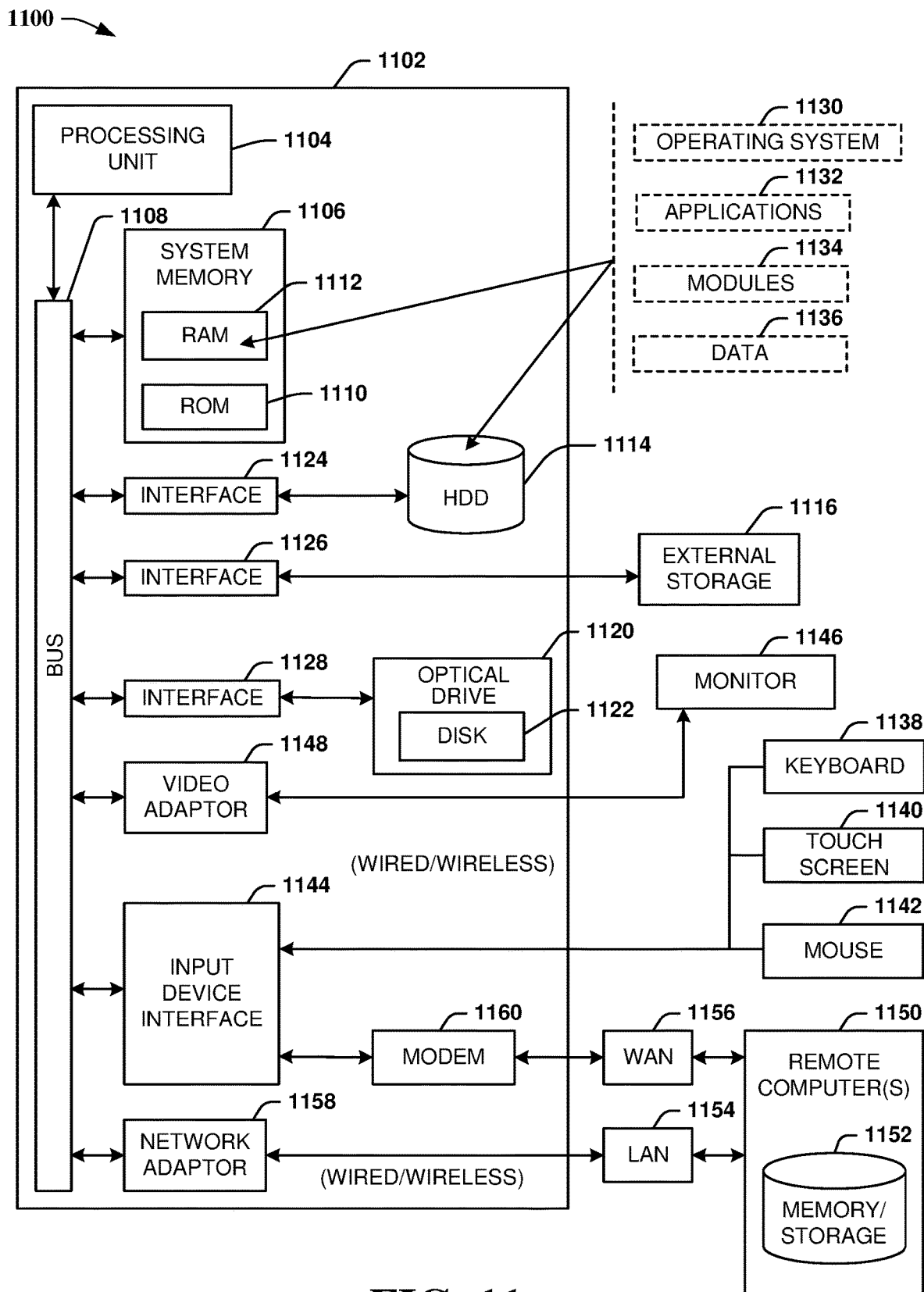
FIG. 11 is a block diagram representing an illustrative non-limiting computing system or operating environment in which one or more aspects of various embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that in various embodiments, methods disclosed herein can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As utilized herein, terms "component," "system," "server," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Further, aspects, features, and/or advantages of the disclosed subject matter can be exploited in substantially any wireless telecommunication or radio technology, e.g., IEEE 802.XX technology, e.g., Wi-Fi, Bluetooth, etc.; WiMAX; enhanced GPRS; 3GPP LTE; 3GPP2; UMB; 3GPP UMTS; HSPA; high speed downlink packet access (HSDPA); high speed uplink packet access (HSUPA); LTE-A, GSM, NFC, Wibree, Zigbee, satellite, Wi-Fi Direct, etc.

Further, selections of a radio technology, or radio access technology, can include second generation (2G), third generation (3G), fourth generation (4G), fifth generation (5G), xth generation, etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over IP (VoIP) service that delivers voice communications over IP networks such as the Internet or other packet-switched networks. Further, the foregoing terms are utilized interchangeably in the subject specification and related drawings.

A communication network, e.g., corresponding to a wireless system (see e.g., 100), for systems, methods, and/or apparatus disclosed herein can include any suitable mobile and/or wireline-based circuit-switched communication network including a GSM network, a time division multiple access (TDMA) network, a code division multiple access (CDMA) network, such as an Interim Standard 95 (IS-95) and subsequent iterations of CDMA technology, an integrated digital enhanced network (iDEN) network and a PSTN. Further, examples of the communication network can include any suitable data packet-switched or combination data packet/circuit-switched communication network, wired or wireless IP network such as a VoLTE network, a VoIP network, an IP data network, a UMTS network, a GPRS network, or other communication networks that provide streaming data communication over IP and/or integrated voice and data communication over combination data packet/circuit-switched technologies.

Similarly, one of ordinary skill in the art will appreciate that a wireless device, e.g., a wireless communication device, a user equipment, etc. for systems, methods, and/or apparatus disclosed herein can include a mobile device, a mobile phone, a 4G, a 5G, etc. cellular communication device, a PSTN phone, a cellular communication device, a cellular phone, a satellite communication device, a satellite phone, a VoIP phone, Wi-Fi phone, a dual-mode cellular/Wi-Fi phone, a combination cellular/VoIP/Wi-Fi/WiMAX phone, a portable computer, or any suitable combination thereof. Specific examples of a wireless system can include, but are not limited to, a cellular device, such as a GSM, TDMA, CDMA, IS-95 and/or iDEN phone, a cellular/Wi-Fi device, such as a dual-mode GSM, TDMA, IS-95 and/or iDEN/VoIP phones, UMTS phones, UMTS VoIP phones, or like devices or combinations thereof.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various aspects of the subject specification, artificial intelligence based systems, components, etc. can employ classifier(s) that are explicitly trained, e.g., via a generic training data, as well as implicitly trained, e.g., via observing characteristics of communication equipment, e.g., a gateway, a wireless communication device, etc., by receiving reports from such communication equipment, by receiving operator preferences, by receiving historical information, by receiving extrinsic information, etc.

For example, support vector machines can be configured via a learning or training phase within a classifier constructor and feature selection module, component, etc. Thus, the classifier(s) can be used by an artificial intelligence system to automatically learn and perform a number of functions, e.g., performed by a system (e.g., 100), including but not limited to: determining passive intermodulation interference corresponding to uplink signals that have been received, via a configurable cellular antenna array of a base station device, from respective wireless devices of a group of wireless devices that have been communicatively coupled to the base station device; and selecting a defined configuration of a group of cellular antenna ports of the configurable cellular antenna array to facilitate a reduction of the passive intermodulation interference corresponding to the uplink signals A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user, e.g., subscriber, desires to be automatically performed. In the case of communication systems, for example, attributes can be information received from access points, services, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Further, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations by the processor, the operations comprising:
determining a passive intermodulation interference corresponding to uplink signals that have been received, via a configurable cellular antenna array of a base station, from respective devices of a group of devices that have been communicatively coupled to the base station; and
selecting a defined configuration of a group of cellular antenna ports of the configurable cellular antenna array to facilitate a reduction of the passive intermodulation interference corresponding to the uplink signals, wherein the selecting the defined configuration of the group of cellular antenna ports comprises reconfiguring a portion of cellular antenna ports of the group of cellular antenna ports corresponding to a downlink channel that is associated with downlink sector beams that have been transmitted to the group of devices to facilitate an increase of an uplink communication range of an uplink channel corresponding to the uplink signals, and wherein the reconfiguring the portion of cellular antenna ports comprises disabling the portion of cellular antenna ports corresponding to the downlink channel to facilitate the increase of the uplink communication range.

2. The system of claim 1, wherein the uplink signals are first uplink signals, and wherein the determining the passive intermodulation interference comprises:
enabling, via the configurable cellular antenna array, available transmit portions of a group of carriers;
based on downlink transmissions of the available transmit portions of the group of carriers, determining an observed spectral signature of second uplink signals that have been received via the configurable cellular antenna array;
determining a group of ordered products representing a predicted spectral signature that has a defined similarity to the observed spectral signature;
based on the predicted spectral signature, selecting an interference portion of carriers of the group of carriers that have been determined to have contributed to the passive intermodulation interference; and
determining an associated portion of cellular antenna ports of the group of cellular antenna ports corresponding to the interference portion of carriers.

3. The system of claim 2, wherein the selecting the defined configuration of the group of cellular antenna ports further comprises:
selecting a remaining portion of cellular antenna ports of the group of cellular antenna ports that does not comprise the associated portion of cellular antenna ports corresponding to the interference portion of carriers; and receiving, via the remaining portion of the cellular antenna ports, other uplink signals from the respective devices to facilitate the reduction of the passive intermodulation interference.

4. The system of claim 1, wherein the selecting the defined configuration of the group of cellular antenna ports further comprises:

selecting a second portion of cellular antenna ports from the group of cellular antenna ports for transmission of the downlink sector beams to the group of devices to facilitate the reduction of the passive intermodulation interference; and transmitting, via the second portion of the cellular antenna ports, the downlink sector beams to the group of devices to facilitate the reduction of the passive intermodulation interference.

5. The system of claim 1, wherein the selecting the defined configuration of the group of cellular antenna ports further comprises:

modifying respective transmission powers of at least a second portion of cellular antenna ports of the group of cellular antenna ports for transmission of the downlink sector beams to the group of devices to facilitate the reduction of the passive intermodulation interference; and transmitting, via the at least the second portion of cellular antenna ports, the downlink sector beams to the group of devices to facilitate the reduction of the passive intermodulation interference.

6. The system of claim 1, wherein the selecting the defined configuration of the group of cellular antenna ports further comprises:

modifying respective elevations of at least a second portion of cellular antenna ports of the group of cellular antenna ports for transmission of the downlink sector beams to the group of devices to facilitate the reduction of the passive intermodulation interference; and transmitting, via the at least the second portion of cellular antenna ports, the downlink sector beams to the group of devices to facilitate the reduction of the passive intermodulation interference.

7. The system of claim 1, wherein the selecting the defined configuration of the group of cellular antenna ports further comprises:

modifying respective azimuths of at least a second portion of cellular antenna ports of the group of cellular antenna ports for transmission of the downlink sector beams to the group of devices to facilitate the reduction of the passive intermodulation interference; and transmitting, via the at least the second portion of cellular antenna ports, the downlink sector beams to the group of devices to facilitate the reduction of the passive intermodulation interference.

8. The system of claim 1, wherein the selecting the defined configuration of the group of cellular antenna ports further comprises:

modifying respective properties of at least one of: an uplink beam corresponding to an uplink channel associated with the uplink signals, a downlink sector beam of the downlink sector beams, or a cellular antenna port of the group of cellular antenna ports to facilitate the reduction of the passive intermodulation interference.

9. The system of claim 8, wherein the respective properties comprise at least one of:

a polarization of at least one of: the uplink beam, the downlink sector beam, or the cellular antenna port, a bandwidth portion of at least one of: the uplink beam, the downlink sector beam, or the cellular antenna port, a direction of the downlink sector beam with respect to a phase of the downlink sector beam corresponding to a transmission frequency of the downlink sector beam, or an amplitude of the downlink sector beam.

10. The system of claim 1, wherein the selecting the defined configuration of the group of cellular antenna ports further comprises:

modifying an amount of the downlink sector beams that are included in a group of downlink sector beams for transmission of the group of downlink sector beams to the group of devices to facilitate the reduction of the passive intermodulation interference.

11. A method, comprising:

determining, by a network equipment comprising a processor, a passive intermodulation interference corresponding to uplink signals that have been received, via ports of an antenna array of the network equipment, from respective user equipment that have been communicatively coupled to the network equipment; and configuring, by the network equipment, the ports of the antenna array to facilitate a reduction of the passive intermodulation interference, wherein configuring the ports comprises reconfiguring a portion of the ports of the antenna array corresponding to a downlink channel corresponding to downlink sector beams that have been transmitted to the respective user equipment to facilitate a modification of an uplink communication range of an uplink channel corresponding to the uplink signals, and wherein the reconfiguring the portion of the ports of the antenna array comprises disabling the portion of the ports of the antenna array corresponding to the downlink channel to facilitate the modification of the uplink communication range.

12. The method of claim 11, wherein the uplink signals are first uplink signals, and wherein the configuring the ports of the antenna array further comprises:

in response to the ports of the antenna array being loaded with all available transmit portions of a group of carriers, determining an observed spectral signature of second uplink signals that have been received from the respective user equipment via the ports of the antenna array;

determining a group of ordered products representing a predicted spectral signature that has a defined similarity to the observed spectral signature;

based on the predicted spectral signature, selecting an interference portion of carriers of the group of carriers that have been determined to have contributed to the passive intermodulation interference; and in response to a first portion of the ports of the antenna array being determined to correspond to the interference portion of carriers, selecting a second portion of the ports that does not comprise the first portion for reception of other uplink signals from the respective user equipment to facilitate the reduction of the passive intermodulation interference.

13. The method of claim 11, wherein the configuring the ports of the antenna array further comprises:

selecting a second portion of the ports of the antenna array for reception of uplink beams from the respective user equipment or for transmission of downlink sector beams to the respective user equipment to facilitate the reduction of the passive intermodulation interference.

14. The method of claim 11, wherein the configuring the ports of the antenna array further comprises:
modifying at least one of: an uplink beam corresponding to the uplink signals, a downlink sector beam of a group of downlink sector beams to be transmitted to at least one user equipment of the respective user equipment, or a port of the ports to facilitate the reduction of the passive intermodulation interference, wherein the modifying of the uplink beam or the downlink sector beam comprises modifying at least one of:
a polarization of: the uplink beam or the downlink sector beam,
a frequency of the downlink sector beam,
a direction of the downlink sector beam with respect to a phase of the downlink sector beam corresponding to a transmission frequency of the downlink sector beam, or
an amplitude of the downlink sector beam.

15. A non-transitory machine-readable medium, comprising executable instructions that, when executed by a system comprising a processor, facilitate performance of operations, the operations comprising:
determining a passive intermodulation interference corresponding to uplink signals that have been received, via respective ports of a cellular antenna array of a base station device of the system, from respective wireless devices communicatively coupled to the base station device; and
determining configurations of the respective ports to facilitate a mitigation of the passive intermodulation interference, wherein the determining the configurations of the respective ports comprises reconfiguring at least some of the respective ports corresponding to a downlink channel corresponding to downlink sector beams that have been transmitted to the respective wireless devices to facilitate an increase of an uplink communication range of an uplink channel corresponding to the uplink signals, and wherein the reconfiguring the at least some of the respective ports comprises disabling the at least some of the respective ports corresponding to the downlink channel to facilitate the increase of the uplink communication range.

16. The non-transitory machine-readable medium of claim 15, wherein the determining the configurations of the respective ports to facilitate the mitigation of the passive intermodulation interference further comprises at least one of:
selecting a first portion of the respective ports for reception of other uplink signals from the respective wireless devices,
selecting a second portion of the respective ports for transmission of downlink sector beams from the respective ports to the respective wireless devices,
modifying a transmission power of a port of the respective ports,
modifying a tilt of the port,
modifying an azimuth of the port,
modifying a number of the downlink sector beams that are transmitted from the respective ports to the respective wireless devices, or
modifying at least one of: an uplink beam corresponding to the uplink signals, a downlink sector beam of the downlink sector beams, or a port of the respective ports to facilitate the mitigation of the passive intermodulation interference.

17. The non-transitory machine-readable medium of claim 16, wherein the modifying the at least one of: the uplink beam, the downlink sector beam, or the port comprises modifying at least one of:
a polarization of: the uplink beam, the downlink sector beam, or the port,
a bandwidth portion of: the uplink beam, the downlink sector beam, or the port,
a frequency of the downlink sector beam,
a direction of the downlink sector beam with respect to a phase of the downlink sector beam corresponding to a transmission frequency of the downlink sector beam, or
an amplitude of the downlink sector beam.

18. The non-transitory machine-readable medium of claim 15, wherein the determining the configurations of the respective ports to facilitate the mitigation of the passive intermodulation interference further comprises:
selecting a second portion of the respective ports for transmission of the downlink sector beams to the respective wireless devices to facilitate the mitigation of the passive intermodulation interference; and
transmitting, via the second portion of the respective ports, the downlink sector beams to the respective wireless devices to facilitate the mitigation of the passive intermodulation interference.

19. The non-transitory machine-readable medium of claim 15, wherein the determining the configurations of the respective ports to facilitate the mitigation of the passive intermodulation interference further comprises:
modifying respective transmission powers of at least a second portion of the respective ports for transmission of the downlink sector beams to the respective wireless devices to facilitate the mitigation of the passive intermodulation interference; and
transmitting, via the at least the second portion of the respective ports, the downlink sector beams to the respective wireless devices to facilitate the mitigation of the passive intermodulation interference.

20. The non-transitory machine-readable medium of claim 15, wherein the determining the configurations of the respective ports to facilitate the mitigation of the passive intermodulation interference further comprises:
modifying respective elevations of at least a second portion of the respective ports for transmission of the downlink sector beams to the respective wireless devices to facilitate the mitigation of the passive intermodulation interference; and
transmitting, via the at least the second portion of the respective ports, the downlink sector beams to the respective wireless devices to facilitate the mitigation of the passive intermodulation interference.

* * * * *